United States Patent
Gurberg et al.

(10) Patent No.: US 8,926,779 B2
(45) Date of Patent: Jan. 6, 2015

(54) METHOD FOR MAKING LAMINATE SHEETS WITH FLEXIBLE HINGES FOR BINDING INTO SECURITY DOCUMENTS

(75) Inventors: Barry David Gurberg, Orleans (CA); Mark William Forest, Ottawa (CA); Ianthe E. M. Patterson, Ottawa (CA); Dennis Curt Buter, Greely (CA)

(73) Assignee: Canadian Bank Note Company, Limited (CA)

( * ) Notice: Subject to any disclaimer, the term of this patent is extended or adjusted under 35 U.S.C. 154(b) by 432 days.

(21) Appl. No.: 13/256,035

(22) PCT Filed: Jul. 12, 2011

(86) PCT No.: PCT/CA2011/000795
§ 371 (c)(1),
(2), (4) Date: Sep. 12, 2011

(87) PCT Pub. No.: WO2013/006939
PCT Pub. Date: Jan. 17, 2013

(65) Prior Publication Data
US 2013/0017353 A1    Jan. 17, 2013

(51) Int. Cl.
*B32B 37/00* (2006.01)
*B32B 38/10* (2006.01)
*B28B 11/12* (2006.01)
*B42D 13/00* (2006.01)
*B42D 25/00* (2014.01)

(52) U.S. Cl.
CPC ............. *B42D 13/00* (2013.01); *B42D 15/10* (2013.01); *B42D 2031/20* (2013.01); *B42D 2033/40* (2013.01); *B42D 2037/08* (2013.01)
USPC ........... 156/250; 156/268; 156/269; 264/138; 264/157; 264/271.1; 264/279.1

(58) Field of Classification Search
CPC ......... A63F 3/0695; B32B 3/30; B32B 27/36; B32B 37/06; B32B 37/10; B32B 37/206; B42D 13/00; B42D 15/00; B42D 2037/08; B42D 2033/40; B42D 2031/20; B42D 2031/22; B42D 2031/24
USPC ............. 428/43, 76, 167, 172; 283/107, 108; 156/250, 268, 269, 288; 264/138, 157, 264/241, 271.1, 279.1, 309
See application file for complete search history.

(56) References Cited

U.S. PATENT DOCUMENTS 6,135,503 A    10/2000    Lob et al.
6,213,702 B1    4/2001    Wesselink
(Continued)

FOREIGN PATENT DOCUMENTS

EP    1380442 A1    1/2004
EP    1245407 B1    4/2006
(Continued)

OTHER PUBLICATIONS

International Search Report issued in corresponding PCT Application PCT/CA2011/000795 on Sep. 15, 2011 [8 pages].

*Primary Examiner* — Donald J Loney
(74) *Attorney, Agent, or Firm* — IPLM Group, P.A.

(57) ABSTRACT

A hard laminate sheet with flexible hinge for binding into a security document is provided. Hard synthetic material layers are overlaid, sandwiching a flexible material layer having a hinge portion configured for separation from the hard synthetic material layers, and an affixing portion configured to become affixed to the hard synthetic material layers, upon lamination of the overlaid layers. The overlaid layers are laminated to form a laminate sheet having an embedded hinge affixed to the hard synthetic material layers. Score cuttings are made along a score line coinciding with an inner hinge edge on a hinge side which is then flexed until the hard synthetic material layers break along the inner hinge edge. Residual laminate layers are separated from the hinge side to expose the hinge portion of the flexible material.

15 Claims, 3 Drawing Sheets

(56) References Cited

U.S. PATENT DOCUMENTS 7,040,981 B2 5/2006 Iliescu et al.
2007/0273145 A1 11/2007 Betz et al.
2008/0284155 A1* 11/2008 Christen et al. .............. 283/63.1

FOREIGN PATENT DOCUMENTS

| EP | 1731327 A1 | 12/2006 |
| WO | WO 2007/034129 A1 | 3/2007 |
| WO | 2008/135285 A1 | 11/2008 |

* cited by examiner

METHOD FOR MAKING LAMINATE SHEETS WITH FLEXIBLE HINGES FOR BINDING INTO SECURITY DOCUMENTS

FIELD OF THE INVENTION

The invention relates to an improvement over means for manufacturing a laminate sheet for inclusion, as a page, in a security document having multiple pages bound together along one side.

BACKGROUND OF THE INVENTION

Security documents, such as passports, usually comprise multiple pages which are bound together along one side, for example, by sewing sheets down the middle and then folding them at the sewing line whereby the fold edge becomes the bound side. One such page may be provided with an embedded contactless integrated circuit chip and antenna forming part of a security system designed to enhance the level of security associated with the document. Unlike other pages of the document made of paper, it is desirable that one page be made of a hard and durable synthetic material, such as a laminate of polycarbonate, which may be printed using a laser engraving process to provide greater security and/or may house an embedded circuit chip. However, unlike paper, a hard synthetic material sheet is unable to withstand stitching or folding during the binding of the document pages and this requires that it be incorporated into the security document by other means.

One such means is to affix the hard synthetic material sheet to a flexible band which can be effectively bound together with the other sheets of the security document. However, not all materials can be securely affixed to a hard synthetic material such as a polycarbonate laminate. Where like materials are selected for both the hard synthetic material sheet and flexible material layer, it is to be expected that they can be successfully laminated together to form a secure bond. An example of this is European Patent Application No. EP 1,245,407 of Setec Oy published on 27 Mar., 2002. However, the task of securely laminating or gluing together two dissimilar materials, such as a hard, polycarbonate material and a flexible material such as nylon, is problematic because instead of permanently bonding together they may be expected to fail to bond or to peel away from each other due to the incompatibility of the materials. For obvious reasons, any propensity for such impermanent bonding or peeling away between layers of the sheet materials is not acceptable for security document applications. Consequently, in order to couple a flexible material, of a type that can be sewn into a security booklet, to a hard laminate sheet it is desirable to have a durable and efficient method that allows direct coupling of those dissimilar materials in a permanent bond. In particular, it is desirable that a flexible material be used because of its advantageous properties for binding; however, a material such as nylon is unable to form a lamination bond with a polycarbonate sheet.

U.S. Pat. No. 6,213,702 to Wesselink, issued 10 Apr., 2001, discloses one solution to such problem posed by dissimilar materials, whereby a flexible band is affixed to a finished hard, synthetic sheet, referred to as a plate, by means of a separate joining strip positioned over the band. The joining strip is configured with projections to mechanically fit into mating perforations formed along the edge of the flexible band which is positioned over the hard sheet whereby the only direct connection made is between the joining strip and the plate, the connecting surfaces being the bottom surfaces of the projections and the top surfaces of the plate exposed by the perforations in the band. Those connecting surfaces of the separate joining strip and the plate are affixed by means of either a mechanical clamping fit between the projections and perforations or by fusing them together (i.e. by melting them together by ultrasonic welding if the material layer used for the joining strip is the same as that of the plate). However that possible solution has the disadvantage of requiring use of a separate joining strip.

European Patent No. 1,380,442 to Setec Oy, published on 14 Jan., 2004 discloses a security document comprising a durable data sheet with a more flexible band at one end for binding with additional sheets, whereby the data sheet is made up of several layers of which the inner layers are those which make up the flexible band and the outer layers are hard and durable. The data sheet is formed by laminating all of the layers together in the data area of those sheets but preventing lamination of the layers adjacent the flexible band by positioning upper and lower intermediary separation layers between them in only that end area. After lamination of the multiple layers together, the end layers above and below the separation layers are removed by cutting through the upper layers to the upper separation layer and cutting through the bottom layers to the lower separation layer. U.S. Pat. No. 6,135,503 to Lob et al. issued on 24 Oct., 2000 and PCT Published Application No. WO 2008/135285 to Giesecke & Devrient GmbH disclose similar methods employing a separation layer. Disadvantageously, however, these methods require the step of processing such intermediary separation layers in the area of the flexible band which are needed both to prevent lamination of the adjacent layers and to protect the flexible band from being damaged as a result of the cutting step.

U.S. Pat. No. 7,040,981 issued on 9 May, 2006 and assigned to the assignee of this application discloses a method for making a hard laminate sheet with an encased flexible band at one end which, advantageously, does not use a separation layer. A flexible band layer having a number of apertures formed in it, is provided as an intermediate layer at one end only of a laminate sheet, between laminate material layers, and the flexible material is made to overhang beyond the edges of the laminate material layers so as to form a flexible hinge component extending beyond the laminate sheet. In the remaining area adjacent to the flexible material layer, a laminate material layer is provided. Upon lamination of the sheet layers the adjacent laminate material layers bond together and, although the flexible band layer material does not bond to the adjacent laminate material layers, the laminate material layers which are adjacent to each other in the areas of the apertures formed in the flexible band layer do laminate and bond together within the areas of those apertures. These areas of bonded synthetic materials extend through the apertures of the flexible band layer and, thus, become encased within the laminate sheet. Advantageously, this serves to effectively secure the flexible band layer to the laminate sheet. The portion of the flexible band which overhangs the laminate sheet layers provides a flexible hinge that can be used to bind the laminate sheet within a security document. Disadvantageously, however, the need to overhang the flexible band component beyond the edges of the laminate sheet layers limits the production process to strips of two sheets only, so as to allow one overhang to extend along one edge of a laminating machine and the other overhang to extend along the opposite edge of the laminating machine. This limited processing ability results in less efficient production. Further, the multiple layer edges next to the flexible hinge, following lamination, are prone to inconsistent quality in the position, straightness and appearance of the edge as compared to the other edges of the laminate sheet which are cut.

Accordingly, there is a need for improvement over the inventions of the foregoing references in order to overcome the aforementioned disadvantages and provide improved manufacturing efficiency and options.

SUMMARY OF THE INVENTION

A method is provided for making a hard laminate sheet with a flexible hinge extending there from for binding into a security document. Layers of a hard synthetic material (e.g. polycarbonate) are overlaid with a flexible material layer (e.g. nylon) there between, whereby a hinge portion of the flexible material layer is located in a hinge side of the overlaid layers and an affixing portion of the flexible material layer is located in a hard synthetic material side of the overlaid layers, the affixing portion configured to affix to the hard synthetic material layers upon lamination of the overlaid layers and the hinge portion configured to be separable from the hard synthetic material layers upon lamination of the overlaid layers. The overlaid layers are laminated (e.g. by applying heat and pressure to the overlaid layers) to form a laminate sheet having an embedded hinge on a hinge side of the laminate sheet, whereby the embedded hinge is affixed to the hard synthetic material side of the laminate sheet. Score cuttings are made along a score line coinciding with an inner hinge edge on top and bottom surfaces of the hinge side of the laminated sheet having an embedded hinge. The hinge side of the laminate sheet is flexed until the hard synthetic material layers break along the inner hinge edge, whereby the hard synthetic material layers on the hinge side form residual laminate layers which are separable from the hinge portion. The residual laminate layers are separated from the hinge side to expose the hinge portion of the flexible material, thereby forming the hard laminate sheet with a flexible hinge extending there from.

The affixing portion of the flexible material layer may include a plurality of spaced apertures configured to affix the affixing portion to the hard synthetic material layers upon lamination of the overlaid layers. As an alternative, an adhesive may be provided between the overlaid layers of hard synthetic material and between the affixing portion of the flexible material layer and layers of hard synthetic material above and below the affixing portion, and laminating by applying pressure to the overlaid layers with the adhesive between the layers of hard synthetic material and the affixing portion.

Optionally, a release layer may be provided between the hinge portion of the flexible material layer and the hard synthetic material layers above and below the hinge portion, the release layer being configured to prevent the hinge portion from becoming affixed to the layers of hard synthetic material upon lamination of the overlaid layers.

Also in accordance with the invention is a method for making a plurality of hard laminate sheets from a composite laminate sheet made by: (I) overlaying layers of a hard synthetic material and providing flexible material layers there between, whereby the layers are arranged to provide an array of laminate sheets integral to the composite laminate sheet, each integral laminate sheet having a hinge portion of a flexible material layer in a hinge side of the laminate sheet and an affixing portion of the flexible material layer in a hard synthetic material side of the laminate sheet, the affixing portion configured to become affixed to the hard synthetic material layers when the overlaid layers are laminated and the hinge portion configured to be separable from the hard synthetic material layers when the overlaid layers are laminated; and, (II) laminating the overlaid layers, thereby forming an array of laminate sheets integral to the composite laminate sheet, each integral laminate sheet having an embedded hinge on a hinge side of the laminate sheet and the embedded hinge being affixed to a hard synthetic material side of the laminate sheet. The composite laminate sheet is subdivided into one of: (a) a plurality of subdivided composite laminate sheets, each subdivided composite laminate sheet comprising a subdivided array of laminate sheets integral to the subdivided composite laminate sheet, each integral laminate sheet having an embedded hinge; and/or, (b) a plurality of individual laminate sheets each having an embedded hinge. The foregoing steps of making score cuttings along a score line coinciding with an inner hinge edge on top and bottom surfaces of the hinge side, flexing the hinge side until the hard synthetic material layers break along the inner hinge edge and separating the residual laminate layers from the hinge side to expose the hinge portion of the flexible material are applied to the integral and/or individual laminate sheets having an embedded hinge. The composite laminate sheet may be subdivided to a configuration determined by an apparatus to be used for binding the laminate sheet into the security document.

A hard laminate sheet with a flexible hinge extending there from, made according to the foregoing, is further provided.

DESCRIPTION OF THE DRAWINGS

The present invention is described in detail below with reference to the following drawings in which like reference numerals refer throughout to like elements.

DESCRIPTION

The invention provides an improved method for making a hard, durable laminate sheet 160 with an exposed hinge 130 for binding into a security document. The laminate sheet 160 has a hard synthetic material side 220 comprising hard synthetic material layers 20 and a flexible material layer 30 encased therein, which may be formed as a strip as illustrated in the drawings, and a hinge side 200 comprising an exposed hinge 130, formed by an exposed portion of the flexible material 30, for use to bind the sheet into a security document. The method and laminate sheet are described below with reference to an embodiment illustrated by the drawings.

Figure 1:
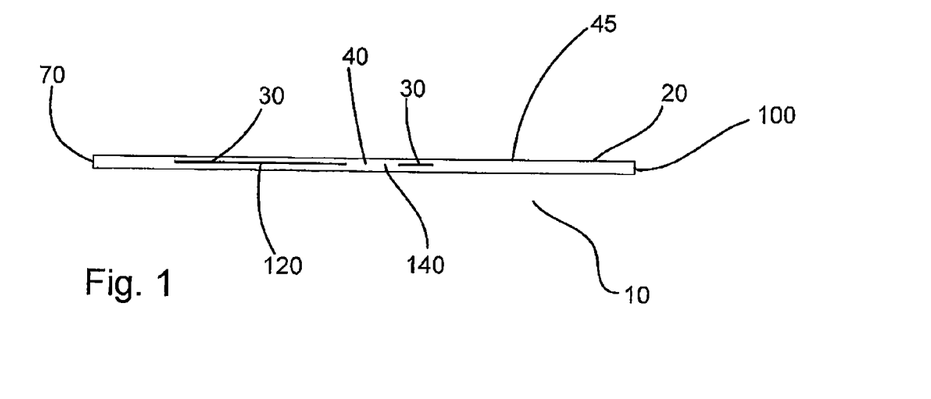
FIG. 1 is a cross-sectional view of a laminate sheet with embedded hinge comprised of a plurality of laminated layers of a hard synthetic material and an intermediate embedded flexible material, arranged in accordance with the invention.

Referring to FIG. 1, a partially constructed laminate sheet is illustrated. FIGS. 2-5 illustrate further steps in the construction of the laminate sheet. FIG. 6 illustrates a composite laminate sheet comprising an array of five rows and four columns of laminate sheets integral to the composite laminate sheet which, upon subdividing the composite laminate sheet, provides twenty individual laminate sheets.

FIG. 1 is a cross-sectional view of a partially constructed laminate sheet 10. A plurality of hard synthetic material layers 20 sandwich an intermediate flexible material layer 30 of lesser width than that of the hard synthetic material layers 20, whereby the flexible material 30 extends from a hinge side 200 of the laminate sheet across an inner hinge edge line 150 to the hard synthetic material side 220 of the laminate sheet. In the illustrated embodiment, the flexible material layer 30 extends into a section (only) of the hard synthetic material side 220. The flexible material layer 30 includes an embedded hinge portion 120 and an affixing portion 140 having multiple apertures therein whereby, upon lamination of the hard synthetic material layers 20 and flexible material layer 30, the affixing portion 140 becomes encased in the hard synthetic material layers 20 and thereby secures the flexible material layer 30 to the laminated layers 45.

The embedded hinge portion 120 and the affixing portion 140 of the flexible material layer 30 are encased within the laminated layers 45 following the lamination process. This allows an array of multiple laminate sheets 10 to be produced by one lamination process applied to a composite laminate sheet 300, an example of which is illustrated in FIG. 6. The number of laminate sheets 10 provided, per lamination process, is determined by the size of the laminator used, the available sizes of sheets of the material(s) selected for the hard synthetic material layers 20 and the desired size of the laminate sheet 160. This is contrary to the method described in U.S. Pat. No. 7,040,981 in which the hinge is exposed during lamination (i.e. in that process the hinge is positioned to extend beyond the outer edge of the synthetic material layers at the time the layers are laminated), which limits the lamination to processing in strips of two (only) adjacent, back-to-back, laminate sheets with their hinges exposed along opposite outer edges of the strips.

In accordance with the illustrated embodiment a composite laminate sheet 300 (see FIG. 6), configured to provide an array of five rows and four columns (5×4) of partially constructed, integral laminate sheets 10 having embedded hinges (see FIGS. 1-3), is prepared by overlaying a plurality of layers of a hard synthetic material 20, selected to be polycarbonate sheets, with an intermediate flexible material layer 30, selected to be nylon, so that the flexible material layer 30 is encased within the laminate layers 45 of each laminate sheet 10 and extends over a predetermined inner hinge edge line 150 which is also referred to hereinafter as the score line. As shown by FIG. 1, the embedded hinge portion 120 of the flexible material layer 30 is located in a hinge side 200 of the partially constructed laminate sheet 10 (by embedded hinge it is meant that the hinge is sandwiched between laminate sheets and laminated). An affixing portion 140 of the flexible material layer 30 is located in a hard synthetic material side 220 of the partially constructed laminate sheet 10. The selections to be made for the number and thicknesses of the layers 20, 30, and for the materials of the layers 20, 30, is described below, but one skilled in the art can readily make an appropriate selection based on the particular application intended and manufacturing equipment and environment.

After the composite laminate sheet 300 has been assembled as aforesaid, it is laminated using a card laminating machine.

Figure 5:
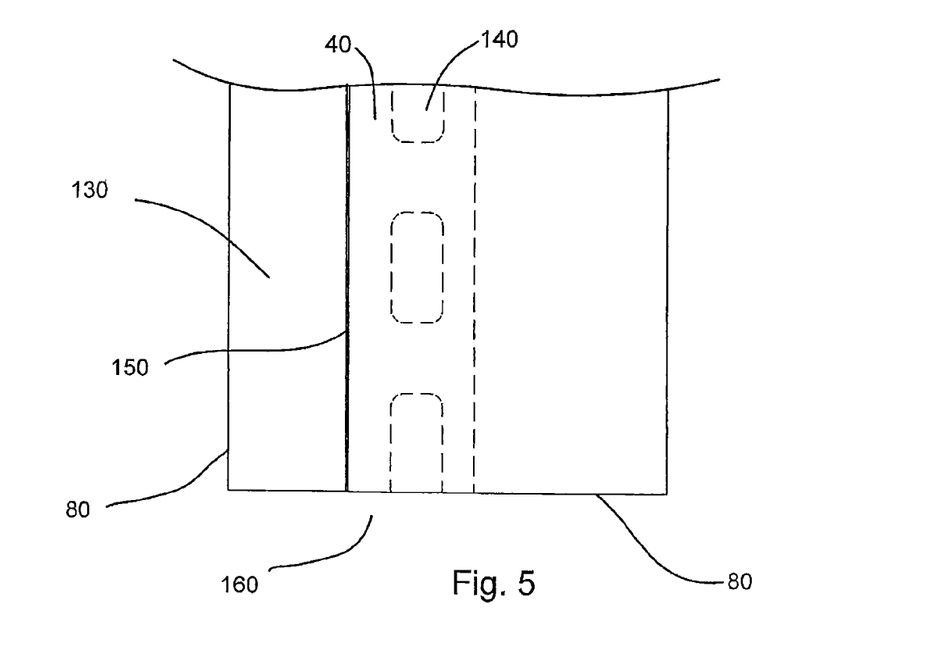
FIG. 5 is a plan view of one end (only) of the laminate sheet of FIG. 4 (the remaining length of the laminate sheet, not shown, having the same configuration); and, FIG. 6 is a plan view of a composite laminate sheet, with cutting lines illustrated to provide an array of five rows and four columns of the laminate sheet of FIG. 1.
Figure 6:
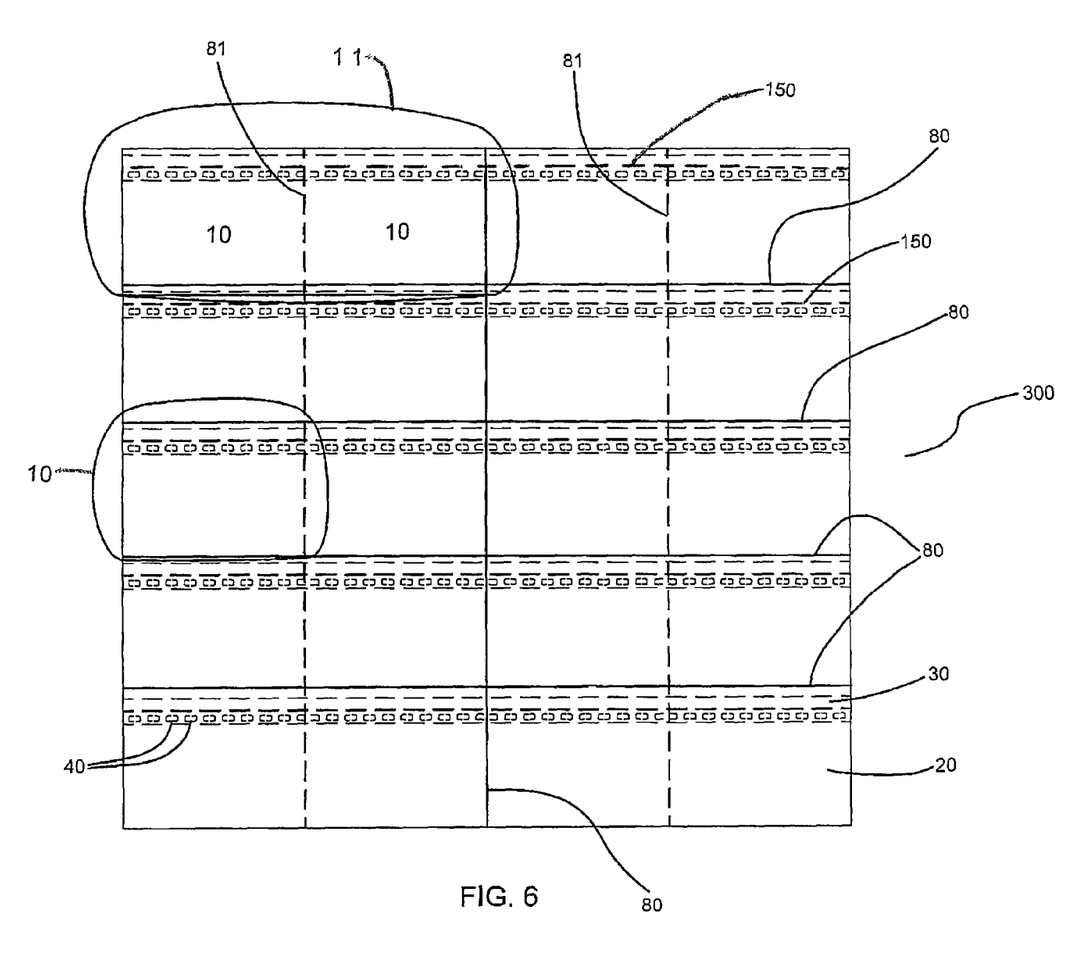

As shown by FIG. 5 of the drawings herein, the affixing portion 140 of the flexible material layer 30 includes a plurality of spaced apertures 40 which serve to indirectly secure the flexible material layer 30 to the polycarbonate layers 20 of the laminate sheet 160. This is because hard synthetic material layers 20 on adjacent sides of (i.e. directly above and directly below) the flexible material layer 30 are directly adjacent each other in the areas of the apertures 40 and, upon lamination, the directly adjacent synthetic material melts and bonds together. Thus, in effect, lamination of the synthetic material layers 20 causes the synthetic material adjacent the apertures 40 to reform and encase the flexible material layer 30 within the laminate sheet 160. This renders the flexible material layer 30 integral to the laminate sheet 160, thereby securing it in a tamper resistant manner.

During the lamination process material of the polycarbonate layers 20 adjacent the flexible material layer 30 also fills in the space surrounding the flexible material layer 30. However, for an embodiment in which a relatively thick flexible material layer is used (i.e. compared to the thicknesses of the adjacent polycarbonate layers), it may be desirable to include a polycarbonate insertion piece of appropriate size (commonly referred to as a plug) beside the flexible material layer when the laminate layers 45 are overlaid prior to lamination.

The embedded hinge portion 120 and affixing portion 140 are unitary, each being a part of the flexible material layer 30, so after lamination the embedded hinge 120 is also secured to the hard synthetic material layers 20 on the hard synthetic material side 220 of each laminate sheet 10 integral to the array of the composite sheet. However, because the material of the embedded hinge portion 120 does not bond during lamination with the hard synthetic material layers 20 adjacent it (and does not include apertures 40 such as those of the affixing portion 140) the embedded hinge 120 is separable from the hard synthetic material layers 20 on the hinge side 200 upon application of a pulling or shear force to those hard synthetic material layers 20.

Figure 2A:
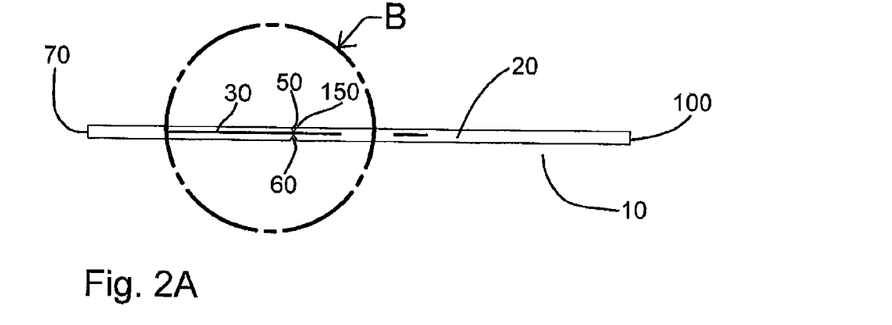
FIG. 2A is a cross-sectional view of the laminate sheet of FIG. 1 to which score cuttings (shown in the area marked "B") have been made in the top and bottom of the outer layers along score lines defining an inner edge of the embedded hinge and extending over the width of the laminate sheet in the area of the intermediate flexible material.
Figure 2B:
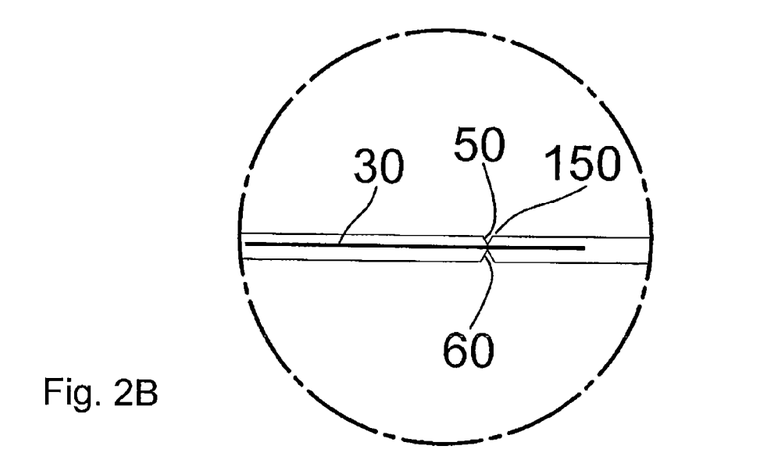
FIG. 2B is a detail view of area "B" of the laminate sheet of FIG. 1 in which the score cuttings are made.

After the composite laminate sheet 300 has been laminated it is subdivided by cutting it along horizontal and vertical cutting lines 80 into multiple, two-on laminate sheets 11 as shown in FIG. 6 (see illustrative marking at the upper left-hand side surrounding a two-on laminate sheet 11 to highlight it). As shown, each two-on laminate sheet 11 comprises two individual laminate sheets 10 (see illustrative marking highlighting an individual laminate sheet 10) of the composite laminate sheet 300. Then the top and bottom surface of each two-on laminate sheet 11 is scored along a score line which coincides with an inner hinge edge 150, as shown in FIG. 2A and the detail drawing of FIG. 2B. This is done by a cutting machine which cuts into the polycarbonate layers 20 from the surface. The scoring consists of cutting into both the top and bottom surfaces along the inner hinge edge 150 (or score line) to form top and bottom score cuttings 50, 60 along the line of the inner hinge edge 150. The cutting is controlled to ensure that each score cutting extends only into the polycarbonate layers and does not reach the affixing portion 140 of the intermediate flexible material layer 30 to avoid damaging the affixing portion 140. The score cuttings 50, 60 focus stress applied to the remaining material in the two-on laminate sheet 11 when it is flexed.

The foregoing choice to use a two-on configuration for further processing, once the composite laminate sheet 300 has been made, is because the two-on laminate sheet configuration satisfies the requirements for later processes to be employed in a particular manufacturing application of the applicant. However, other configurations of laminate sheets comprising a different number of laminate sheets with embedded hinges 10 may instead be used.

The appropriate depth for the scoring is dependent on the materials used and their thicknesses. In the illustrated embodiment, for a lamination of thickness of 880 microns, the scoring depth applied is, optimally, between 25 and 50 microns from the flexible material layer 30 to avoid an irregular inner hinge edge 150. The depth of scoring must not be as deep as the flexible material layer 30 but must be sufficiently deep, given the thickness of the laminate sheet 10, to allow for a clean break and removal of the residue laminate layers 110.

Figure 3:
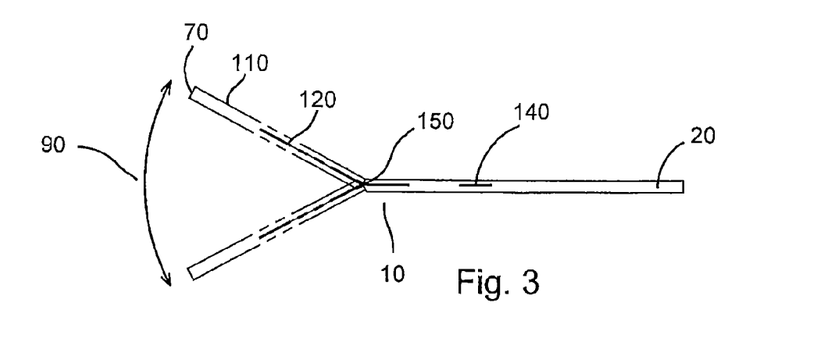
FIG. 3 is a schematic illustration of the scored laminate sheet of FIGS. 2A and 2B, with a flexing action applied to one end of the laminate sheet to produce a back and forth bending motion (indicated by the arrow) centered on the score line, to stress and break the hard synthetic material laminate layers at the score line so they can be removed.
Figure 4:
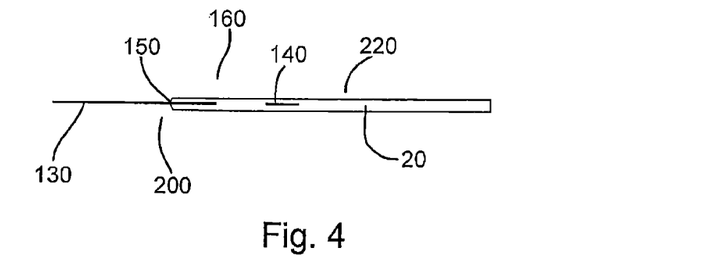
FIG. 4 is a cross-sectional view of the laminate sheet of FIG. 3, showing the exposed hinge following removal of the laminate layers from the hinge side of the laminate sheet.

The residue laminate layers 110 on the hinge side 200 of the laminate sheet 10 (see FIG. 3) of each two-on laminate sheet 11 is removed to provide an exposed hinge 130 (see FIGS. 4 and 5). To do so the hinge sides 200 of the laminate sheets 10 of each two-on laminate sheet 11 are stressed by flexing them back and forth 90 (i.e. bending them), as illustrated by FIG. 3, along the score cuttings 50, 60 marking the inner hinge edge 150. The score cuttings 50, 60 focus stress applied by the flexing to the inner hinge edge 150, causing the hard synthetic material layers 20 to break along that line (i.e. the score line). Advantageously, this occurs as straight, even separation along the score line coinciding with the inner hinge edge 150, thereby providing a quality inner hinge edge 150 similar to the cut edges 80 of the two-on laminate sheet 11. Then, after the residual laminate layers 110 of the hinge sides 200 have broken apart from those of the hard synthetic material sides 220 they are separated from the laminate sheets 10 of the two-on laminate sheet 11 by pulling them and causing them to peel away from the embedded hinge 120. The resulting two-on laminate sheet, when cut along line 81, provides two finished laminate sheets 160 as shown in FIGS. 4 and 5, having an exposed hinge 130 attached to the hard synthetic material side 220 which can be bound into security documents according to conventional means.

For use in a security booklet, the material of the flexible material layer 30 should be selected to be flexible, pliable and durable so that it may act as a hinge without breaking, tearing or otherwise becoming damaged over the expected period (e.g. five years) and manner of use of the security document for which it is to be used. The flexible material is selected to suit the particular application, to be effectively bound into a security document. Conventional book binding equipment does so by sewing it into the security document with other pages of the security document.

Further, the material to be selected for the flexible material layer 30 must have a higher melting temperature than that of the synthetic material layers positioned adjacent to it so as to ensure that the flexible material layer 30 does not melt to those layers. Preferred materials for the flexible material layer 30 will maintain their form, flexibility and strength at the temperatures required to laminate the hard synthetic material layer 20, an example of which is Dartek brand nylon film supplied by DuPont Teijin Films. Although, several materials, such as polypropylene are thin and flexible, they may not be suitable where they are unable to maintain their form during heat lamination.

The number and thicknesses of the layers of the laminate layers 45 are selected according to the desired application. For example, a multi-layering and material selection similar to those disclosed in U.S. Pat. No. 7,040,981 may be selected for a passport document application. Lithographic printing may be applied to inner hard synthetic material layers. The combined thicknesses of the hard synthetic layers above and below the flexible material layer are selected to provide sufficient strength to withstand tearing when any attempt is made to remove the flexible material layer.

Additional layers above or below the flexible material layer may be used where an electronic component (or components) is (or are) to be included, using one layer as an inlay for containing, for example, a contactless chip or chip module and antenna and attachments. For such applications the thicknesses of the layers will be governed by the dimensions of the electronic component(s) and the inlay may be provided by an inlay manufacturer in sheets according to a preselected layout. In every case, these layer(s) are laminated with the other layers of the laminate sheet.

The hard synthetic material layers may be made of the same material, or sufficiently similar material (in terms of achieving the required lamination). For the illustrated embodiment multiple white polycarbonate layers are used with clear polycarbonate layers as outer layers. Of these, the material selected for the clear layers is MakrofollD 6-2 brand laser-engravable and non-laser-engravable polycarbonate supplied by the Bayer Company and the material selected for the white layers is MakrofollD 4-4. These materials are available in various thicknesses and in the illustrated embodiment a total thickness (i.e. of all layers) of 880 microns is achieved. When laminated together at an appropriate temperature, pressure, and time, as may be readily determined by persons skilled in the art, these material layers form a core-to-core bond which is secure (meaning that any attempt to dissect the layers would be difficult and such tampering would be evident upon viewing the page) and durable.

Polycarbonate provides good protection against bending, impact and other stresses that the finished laminate sheet 160 will likely encounter. However, it is to be understood by the skilled reader that although polycarbonate is selected for use in the illustrated embodiment, the invention may, alternatively, be implemented using a range of other materials providing the desirable characteristic of hardness, durability, fracturability (i.e. materials that can be scored and cleanly broken along the score line) including PVC (polyvinyl chloride).

The flexible material layer 30 is a single sheet of flexible material having a hinge portion 120 and an affixing portion 140. The hinge portion 120 is on the hinge side 200 and may extend near to the hinge side outer end 70 of the laminate sheet 10 as shown in the drawings or, alternatively, depending on the location of the horizontal cutting lines 80 to be selected for the particular application, could extend to the outer end 70. The affixing portion 140 is on the hard synthetic material side 220 and does not extend to the opposite hard synthetic material side outer end 100. As described above, the affixing portion 140 is indirectly connected to the hard synthetic material layers 20 of the laminate sheet 10 through apertures 40. The apertures 40 are cut or milled out of the flexible material layer 30 in the area of the affixing portion 140 as shown in the drawings. When the lamination is undertaken the heat causes the material in the hard synthetic material layers 20 directly adjacent the apertures 40 to flow into the cavities of the apertures and form a bond between those hard synthetic material layers. The shape and number of apertures 40 are selected to be of sufficient size to achieve an effective bond between the adjacent polycarbonate layers 20 and, at the same time, to ensure that a sufficient amount of the material of the affixing portion 140 is provided to be encased by those bond areas. In the illustrated embodiment apertures having a width of 4 millimeters and length of 8.5 millimeters are used with a spacing of 14 millimeters between successive apertures 40 and 3 millimeters between the inner hinge edge 150 and the apertures 40.

Optionally, the layers are heat welded to maintain their positioning for the heat lamination. The layers are laminated together at appropriate temperature, pressure and time amounts, as required to form an effective bond of the layers of the laminate sheet. Depending on variables such as the overall thickness and the surface finish of hard synthetic material layers, the temperature, pressure and times used for lamination of the layers will vary and these will be readily determinable by person skilled in the art. For the illustrated embodiment, of which the hard synthetic material is polycarbonate, these are about 174° C., 120 bar, and 18 minutes, respectively.

An alternative method of construction of the laminate sheet 10 to that described above uses an adhesive to attach together the hard synthetic material layers 20 both to themselves and to the affixing portion 140 of the flexible material layer 30. For this method it is not necessary to include apertures 40 in the affixing portion 140 of the flexible material layer 30 and, instead, a suitable adhesive is applied between the layers on the hard synthetic material side 220 of the laminate sheet 10 to allow those unlike materials to bond. However, no adhesive is applied between the embedded hinge 120 and hard synthetic material layers 20 on the hinge side 200 so that upon flexing that side the residual laminate layers 110 will still separate from the embedded hinge 120. Optionally, a release layer may be applied to both sides of the embedded hinge portion 120 to improve the separability of the residual laminate layers 110 upon flexing the hinge side 200 of the laminate sheet 10.

Although stated already, it is hereby emphasized that the examples specified above, with reference to the particulars of the illustrated embodiment, of materials that may be selected for use as the hard synthetic material layers and flexible material layer, are not intended to be comprehensive or limiting in any manner whatsoever, and other material combinations may be selected for use and satisfy the aforesaid functional requirements of those materials. Similarly, a variety of different layer configurations, material thicknesses and lengths, relative hinge and aperture geometries and number of rows and columns forming a composite laminate sheet or "n"-on laminate sheet, may be selected without limitation to those described herein with reference to the illustrated embodiment.

Persons skilled in the field of security printing will be readily able to apply the present invention to implement various applications of the same. Consequently, it is to be understood that the particular embodiment described herein by way of illustration is not intended to limit the scope of the invention claimed herein by the inventors and defined by the appended claims.

What is claimed is:

1. A method for making a hard laminate sheet with a flexible hinge extending there from for binding the laminate sheet into a security document, the method comprising the steps:
   (a) overlaying layers of a hard synthetic material with a flexible material layer there between, whereby a hinge portion of the flexible material layer is located in a hinge side of the overlaid layers and an affixing portion of the flexible material layer is located in a hard synthetic material side of the overlaid layers, the affixing portion configured to affix to the hard synthetic material layers upon lamination of the overlaid layers and the hinge portion configured to be separable from the hard synthetic material layers upon lamination of the overlaid layers;
   (b) laminating the overlaid layers, thereby forming a laminate sheet having an embedded hinge on a hinge side of the laminate sheet which is affixed to the hard synthetic material side of the laminate sheet;
   (c) making score cuttings along a score line coinciding with an inner hinge edge on top and bottom surfaces of the hinge side of the laminated sheet having an embedded hinge;
   (d) flexing the hinge side of the laminate sheet having an embedded hinge until the hard synthetic material layers break along the inner hinge edge, whereby the hard synthetic material layers on the hinge side form residual laminate layers which are separable from the hinge portion; and,
   (e) separating the residual laminate layers from the hinge side to expose the hinge portion of the flexible material, thereby forming the hard laminate sheet with a flexible hinge extending there from.

2. A method according to claim 1 wherein the affixing portion of the flexible material layer includes a plurality of spaced apertures configured to affix the affixing portion to the hard synthetic material layers upon lamination of the overlaid layers.

3. A method according to claim 2 wherein the hard synthetic material is polycarbonate.

4. A method according to claim 3 wherein the flexible material is nylon.

5. A method according to claim 2 wherein a release layer is provided between the hinge portion of the flexible material layer and the hard synthetic material layers above and below the hinge portion, the release layer being configured to prevent the hinge portion from becoming affixed to the layers of hard synthetic material upon lamination of the overlaid layers.

6. A method according to claim 3 wherein the laminating comprises applying heat and pressure to the overlaid layers.

7. A method according to claim 1 wherein an adhesive is provided between the overlaid layers of hard synthetic material and between the affixing portion of the flexible material layer and layers of hard synthetic material above and below the affixing portion, and the laminating comprises applying pressure to the overlaid layers with the adhesive between the layers of hard synthetic material and the affixing portion.

8. A method for making a plurality of hard laminate sheets wherein each laminate sheet has a flexible hinge extending there from for binding the laminate sheet into a security document, the method comprising the steps:
   (a) making a composite laminate sheet comprising:
      (i) overlaying layers of a hard synthetic material and providing flexible material layers there between, whereby the layers are arranged to provide an array of laminate sheets integral to the composite laminate sheet, each integral laminate sheet having a hinge portion of a flexible material layer in a hinge side of the laminate sheet and an affixing portion of the flexible material layer in a hard synthetic material side of the laminate sheet, the affixing portion configured to become affixed to the hard synthetic material layers when the overlaid layers are laminated and the hinge portion configured to be separable from the hard synthetic material layers when the overlaid layers are laminated; and,
      (ii) laminating the overlaid layers, thereby forming an array of laminate sheets integral to the composite laminate sheet, each integral laminate sheet having an embedded hinge on a hinge side of the laminate sheet which is affixed to a hard synthetic material side of the laminate sheet;

(b) subdividing the composite laminate sheet into one of: (i) a plurality of subdivided composite laminate sheets, each subdivided composite laminate sheet comprising a subdivided array of laminate sheets integral to the subdivided composite laminate sheet, each integral laminate sheet having an embedded hinge; and/or, (ii) a plurality of individual laminate sheets each having an embedded hinge;

(c) applying steps (c) through (e) of claim 1 to the integral and/or individual laminate sheets having an embedded hinge.

9. A method according to claim 8 whereby the composite laminate sheet is subdivided to a configuration determined by an apparatus to be used for binding the laminate sheet into the security document.

10. A method according to claim 8 wherein for each integral laminate sheet the affixing portion of the flexible material layer includes a plurality of spaced apertures configured to affix the affixing portion to the hard synthetic material layers upon lamination of the overlaid layers.

11. A method according to claim 10 wherein the hard synthetic material is polycarbonate.

12. A method according to claim 11 wherein the flexible material is nylon.

13. A method according to claim 8 wherein for each integral laminate sheet a release layer is provided between the hinge portion of the flexible material layer and the hard synthetic material layers above and below the hinge portion, the release layer being configured to prevent the hinge portion from becoming affixed to the layers of hard synthetic material upon lamination of the overlaid layers.

14. A method according to claim 10 wherein the laminating comprises applying heat and pressure to the overlaid layers.

15. A method according to claim 8 wherein for each integral laminate sheet an adhesive is provided between the overlaid layers of hard synthetic material and between the affixing portion of the flexible material layer and layers of hard synthetic material above and below the affixing portion, and the laminating comprises applying pressure to the overlaid layers with the adhesive between the layers of hard synthetic material and the affixing portion.

* * * * *